~ F. G. & W. F. NIEDRINGHAUS' IMPROVEMENT IN KETTLES ~
No. 71,900
PATENTED
DEC 10 1867
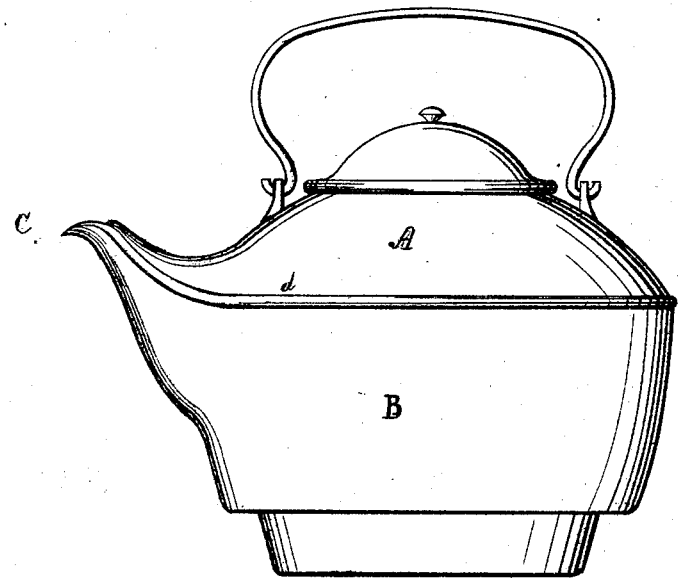
Witnesses:
Saml. S. Boyd
Henry T. Carter
Inventor:
F. G. Niedringhaus
Wm. F. Niedringhaus

United States Patent Office.

FREDERICK G. NIEDRINGHAUS AND WILLIAM F. NIEDRINGHAUS, OF ST. LOUIS, MISSOURI.

Letters Patent No. 71,900, dated December 10, 1867.

IMPROVEMENT IN THE CONSTRUCTION OF STAMPED SHEET-METAL KETTLES.

The Schedule referred to in these Letters Patent and making part of the same.

TO ALL WHOM IT MAY CONCERN:

Be it known that we, FREDERICK G. NIEDRINGHAUS and WILLIAM F. NIEDRINGHAUS, both of the city and county of St. Louis, in the State of Missouri, have invented a new and useful Improvement in Kettles, of which the following is a full, clear, and exact description, reference being had to the annexed drawing, forming a part of this specification, and representing a side elevation of a kettle embodying our improvement.

Our invention consists in forming the nose or spout of a kettle from the bottom and top of same by pressure; the kettle being made of two pieces of sheet metal.

A represents the top, and B the bottom of a kettle, formed by pressure from two pieces of sheet metal, and united at the line $d$. C represents the nose or spout formed from A and B, and united at the line $d$. The spout may be made of any length by additions to same, and we do not intend to limit ourselves to the spout when completely formed in this manner, but shall claim the application of this method of manufacture when only the base of the spout is made in the manner described, and the remaining portion is attached thereto. Spouts constructed in this way cannot be melted off, and as the kettle may be transported in parts, there is also less liability to injury to the spout from breaking or jamming.

We do not claim the method of constructing the kettle by pressure from two plates of sheet metal, since that is already protected by Letters Patent No. 67,425, of which Frederick G. Niedringhaus, above named, is the sole owner by mesne assignments; but What we do claim as our invention, and desire to secure by Letters Patent, is—

The spout of a kettle when formed by pressure from the bottom and top plate of the kettle, when constructed substantially as shown and specified.

F. G. NIEDRINGHAUS,
WM. F. NIEDRINGHAUS.

Witnesses:
SAM'L. S. BOYD,
HENRY T. CARTER.